United States Patent [19]
Husson

[11] 3,843,952
[45] Oct. 22, 1974

[54] METHOD AND DEVICE FOR MEASURING THE RELATIVE DISPLACEMENT BETWEEN BINARY SIGNALS CORRESPONDING TO INFORMATION RECORDED ON THE DIFFERENT TRACKS OF A KINEMATIC MAGNETIC STORAGE DEVICE

[75] Inventor: Bernard Husson, Issy-les-Moulineaux, France

[73] Assignee: Entreprise de Recherches et d'Activites Petrolieres (ELF), Paris, France

[22] Filed: Feb. 23, 1973

[21] Appl. No.: 335,302

[30] Foreign Application Priority Data
Feb. 24, 1972 France ............................... 72.6300

[52] U.S. Cl. ......... 340/172.5, 340/146.1 F, 360/26, 360/51
[51] Int. Cl. ........................................... G06f 11/00
[58] Field of Search... 340/172.5, 174.1 B, 174.1 H, 340/146.1 F

[56] References Cited
OTHER PUBLICATIONS
Crowther, E., "Skew Measuring Circuit", IBM Technical Disclosure Bulletin, Vol. 13, No. 9, Feb. 1971, pp. 2742–2743, A47.

*Primary Examiner*—Raulfe B. Zache
*Attorney, Agent, or Firm*—Lane, Aitken, Dunner & Ziems

[57] ABSTRACT

The relative displacement between the binary signals on a reference track and the binary signals on each of the other tracks of a magnetic recording system is measured by carrying out on each set of two tracks the shaping and gating of signals, the generation of a signal A representing the relative displacement in time between the two signals, the generation of a signal N if the two previously gated signals coexist at least partially, the measurement and storage of the time-duration of the signal A which is recorded by counting if a signal of type N has been generated, the time-durations corresponding to each measurement being summated and divided by the number of measurement in which the signal N is present. The stored quotient represents the mean value of relative displacement between the recordings on the two tracks under comparison, this value being applied to the system for reading the partial information which corresponds to the track considered.

6 Claims, 9 Drawing Figures

FIG. 3'a

FIG. 3'b

Figure 1:
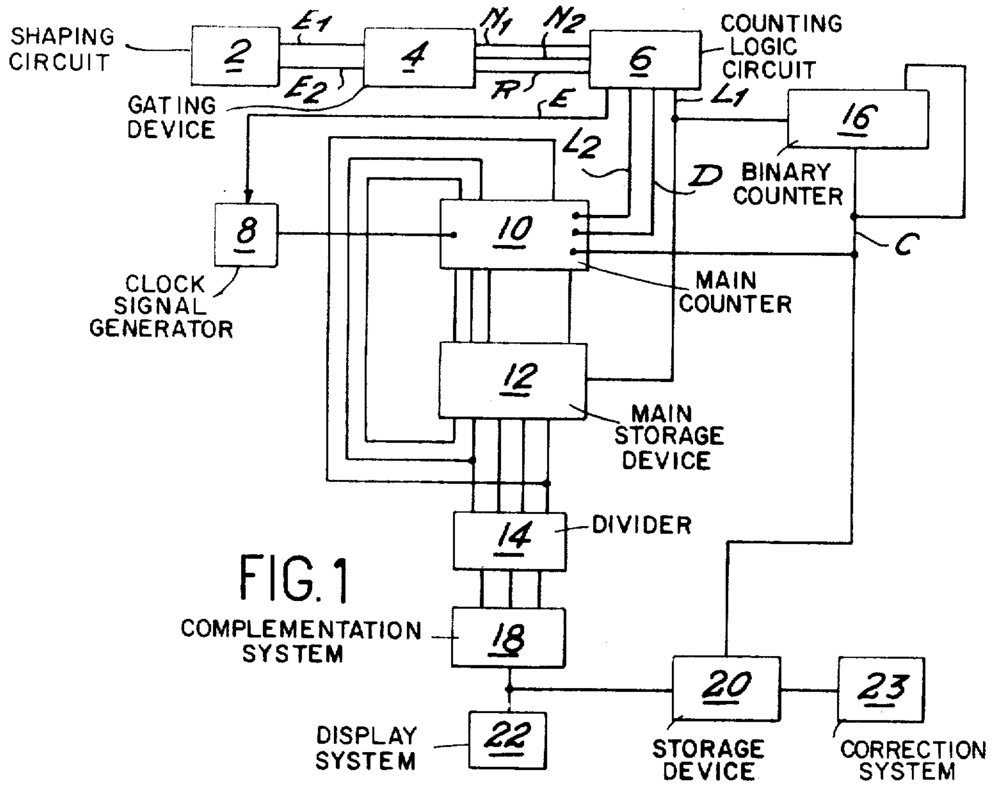

METHOD AND DEVICE FOR MEASURING THE RELATIVE DISPLACEMENT BETWEEN BINARY SIGNALS CORRESPONDING TO INFORMATION RECORDED ON THE DIFFERENT TRACKS OF A KINEMATIC MAGNETIC STORAGE DEVICE

This invention relates to a method and a device for measuring the relative displacement between the binary signals corresponding to information recorded on the different tracks of a kinematic magnetic storage device and for correcting said relative displacement, as applicable to the particular case in which partial binary elements of any single and complete item of information which is also binary is recorded simultaneously on a number of tracks.

A better understanding of the technical problem to be solved may be obtained from a practical example. It will accordingly be assumed that information consisting of numbers written with six binary positioned are to be recorded in a magnetic storage device having six recording tracks. The most rapid solution consists in recording the first binary position (0 or 1) on the first track, the second position on the second track and so on in sequence. The six binary positions corresponding to a given number and therefore to any one item of information are obviously recorded simultaneously at the same instant. If t is the recording period, there are simultaneously recorded after a time interval t the six positions which correspond to the second number or more generally to the second item of information and so forth. In consequence, if the recording device is correctly adjusted, the six pulses of the signals corresponding to a given number and recorded on each of the six tracks are strictly "aligned" in time.

In order to utilize the information, that is to say at the moment of reading of each number in this example, it is obviously necessary to ensure that the six signals recorded on each track and corresponding to any one item of information are read simultaneously. The relative displacement between the signals of each track must at all events be smaller than a given value in order that reading of the information should be correct, namely in order that the recorded number may be reconstituted from the six signals.

It is possible in some cases to record on a reference track a clock signal having a period which is in fact the recording period t ; in other words, said signal supplies a pulse having a level 1 at each instant of recording.

Said relative displacement between the signals can arise either from different positioning of the recording and reading heads or from mechanical deformation of the tape as a result of faulty winding or poor conditions of storage. These defects are liable to appear in particular if the recording conditions are relatively difficult and if the climatic conditions are unfavorable. This is the case with geophysical exploration, for example, when it is desired to make field recordings.

The most common method of compensating for relative displacement consists in the use of an electronic time-delay system. The presence of a 1 triggers a monostable multivibrator which has an adjustable trailing edge. Depending on the relative displacement proper of each tape, said trailing edges can be adjusted so as to be in phase. It is on the basis of these realigned trailing edges that the information is taken into consideration. In this form, if an excessive relative displacement appears during reading, the problem mentioned above is present once again since it is not possible to carry out a manual adjustment during the processing operation.

The precise object of this invention is to provide a method and a device for measuring the relative displacement betwen two numerical data which overcome the disadvantages of the prior art.

All the signals employed in the present invention are binary signals, which means that the signal can occupy only two levels 1 or 0. It will be said that a signal either "exists" or is "present" at a given instant if it presents a pulse at this instant or, in other words, if it occupies the level which is not its quiescent level (e.g., the level 1 if its quiescent level is 0).

The method is characterized in that use is made of a reference track and that the relative displacement between the binary signals contained in said track and those contained in each of the other tracks is measured by carrying out the following operations on each set of two tracks:

- the signals are shaped and gated,
- there is produced a signal A which represents both in magnitude and in sign the relative displacement in time between the two signals,
- there is produced a signal N which is generated only if the two signals which have previously been gated co-exist at least partially or in other words correspond to pulses having at least a partial and common existence in time,
- the time-duration of the signal A is measured and this time-duration is stored,
- said time-duration is taken into account if a signal of type N has been generated and the time-durations corresponding to each measurement are totalized,
- this total time-duration is divided by the number of measurements in which the signal N is present,
- this quotient is then stored and represents the mean relative displacement between the recordings on the two tracks under comparison, namely one of the recording tracks and the reference track,
- the mean relative displacement which is thus measured is applied to the system for reading the partial information which corresponds to the track considered.

In other words, the recordings on each track are compared with a reference track; this track can advantageously be a clock signal which is recorded at the same time as the information. The relative displacement which exists between the signal on the reference track and the signal on the track to be tested is compared. This measurement is performed in the case of a certain number of signals and the total displacement time is divided by the number of signals taken into account. In order that the result should be significant, it is obviously necessary to ensure that each unitary displacement is measured both in magnitude and in sign, that is to say by taking into account the relative position of the signal on the track with respect to the reference signal; it is also necessary to ensure that the relative displacement in fact corresponds to a signal of each track corresponding to one and the same instant of recording, that is to say to the same item of information. The problem arises basically from the fact that the binary signals had the value of 1 or 0 on each track. It is wholly apparent that, when the signal 0 appears on one of the two tracks, it cannot truly be said that there is any relative displacement since the signal exists only on one of the two tracks. It is for this reason that the signal N is generated. In fact, if this latter is not present, there is a signal on only one track at a maximum and the corresponding displacement must not be taken into account for the calculation of the mean relative displacement.

The device is characterized in that it comprises:

- means for shaping the binary signals corresponding to two recording tracks which deliver the corresponding shaped signals $E_1$ and $E_2$,
- means for gating said signals and delivering the signals $N_1$, $N_2$ and R, $N_1$ which exit if $E_1$ exists, the signal $N_2$ which exists if $E_2$ exists, the leading edges of each pulse of the signals $N_1$ and $N_2$ being intended to have the same relative displacement as the trailing edges of the corresponding pulses of the signals $E_1$ and $E_2$ and also to have common trailing edges, the leading edge of each pulse of the signal R being later in time than the leading edges of the signals $N_1$ and $N_2$ whilst its trailing edge is later in time than that of $N_1$ and $N_2$,
- a counting logic circuit comprising means for generating a signal $L_1$ which exists if $N_1$ and $N_2$ are present simultaneously, a signal $L_2$ which exists if one of the signals $N_1$ and $N_2$ is present and which is later in time than $L_1$, a signal E having a width which is proportional to the distance between the leading edges of $N_1$ and $N_2$ and a signal D which represents the order of appearance of the signals $N_1$ and $N_2$ and the leading edge of which coincides with that of the signal E,
- a main binary counter which counts the pulses delivered by a recurrent-signal generator during the period of the signal E and in which the direction of counting is imposed by the signal D,
- a main storage device connected to the outputs of the main binary counter and the access of which is controlled by the signal $L_1$, the signal $L_2$ being intended to reload the main counter to the value possessed by the storage device at the time of the previous measurement, each output of the storage device being fed back to the corresponding input of the main counter,
- a secondary counter whose input is driven by the signal $L_1$ and preset at a value M, said counter being intended to emit the output signal C when it has counted M pulses of the signal $L_1$,
- a divider for dividing by the number M, the input of which is connected to the output of the main storage device and the output of which drives the input of a secondary storage device whose control input is in turn driven by the delayed signal C,
- a correction system comprising a plurality of delay elements and applying in the recorded-information reading circuit a time-delay which is equal to the delay recorded by the secondary storage device.

If the signals of the method are compared with those of the device, it is found that A plays the same part as E and D together and that N and $L_1$ have the same function.

Figure 2:
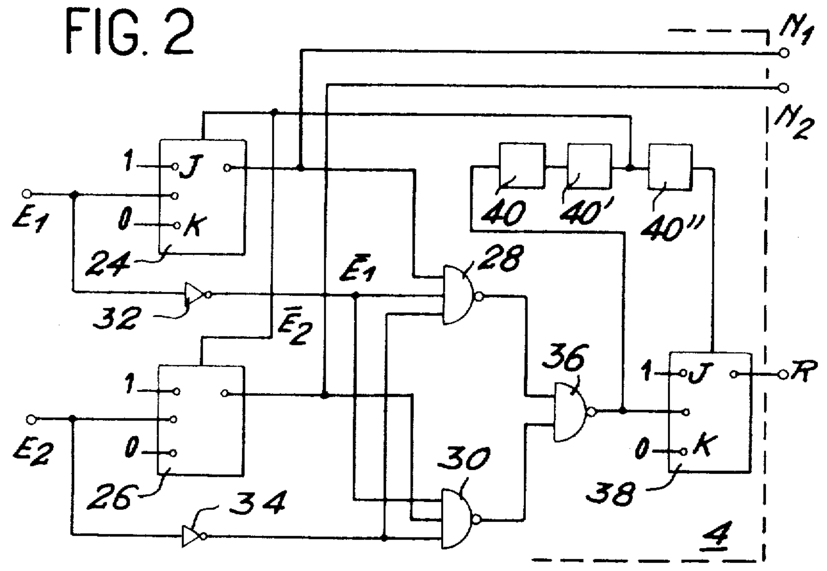
Figure 2:
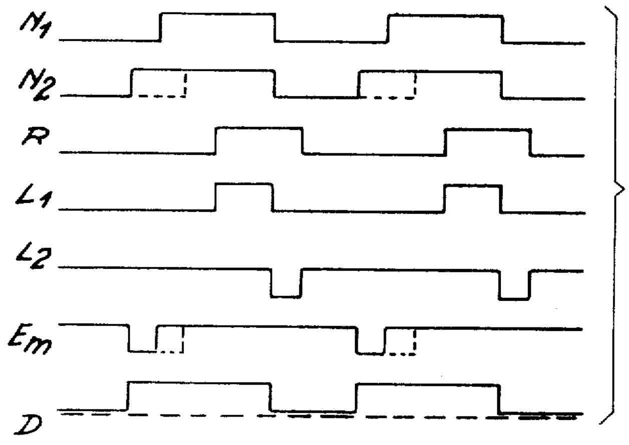
Figure 2:
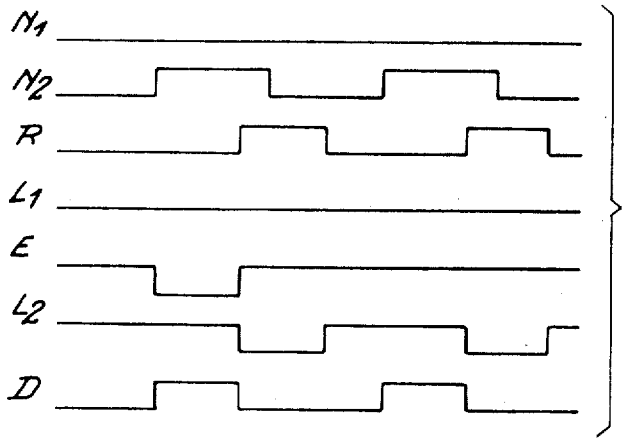
Figure 2:
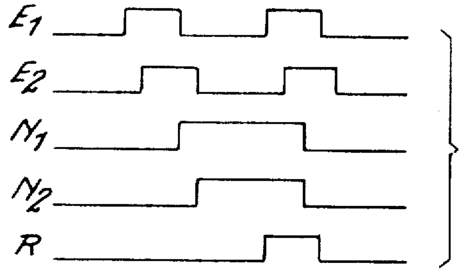
Figure 3:
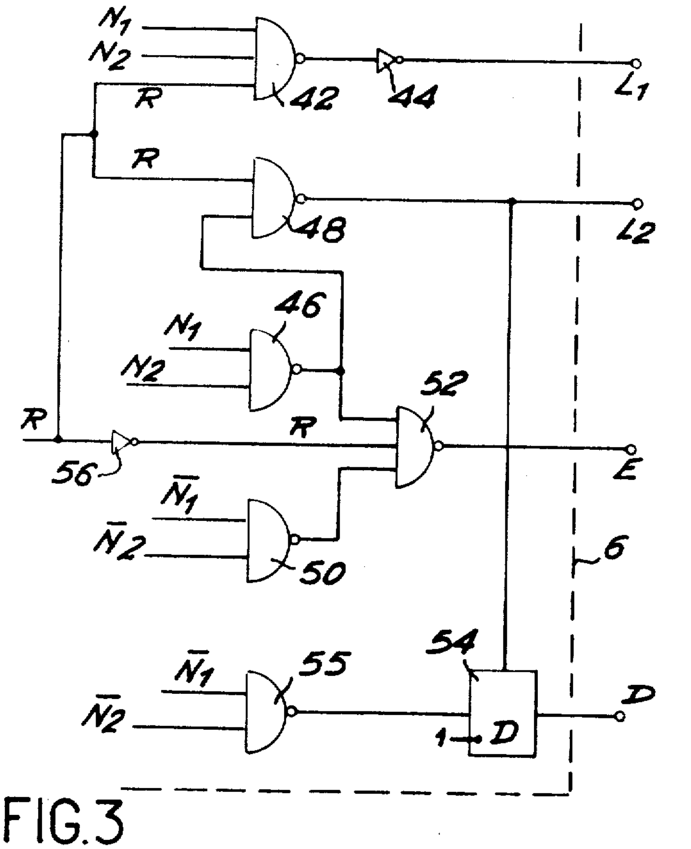
Figure 5:
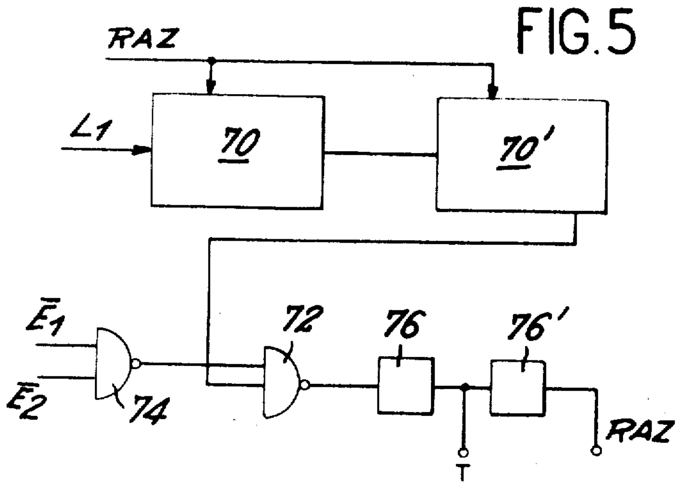
Figure 4:
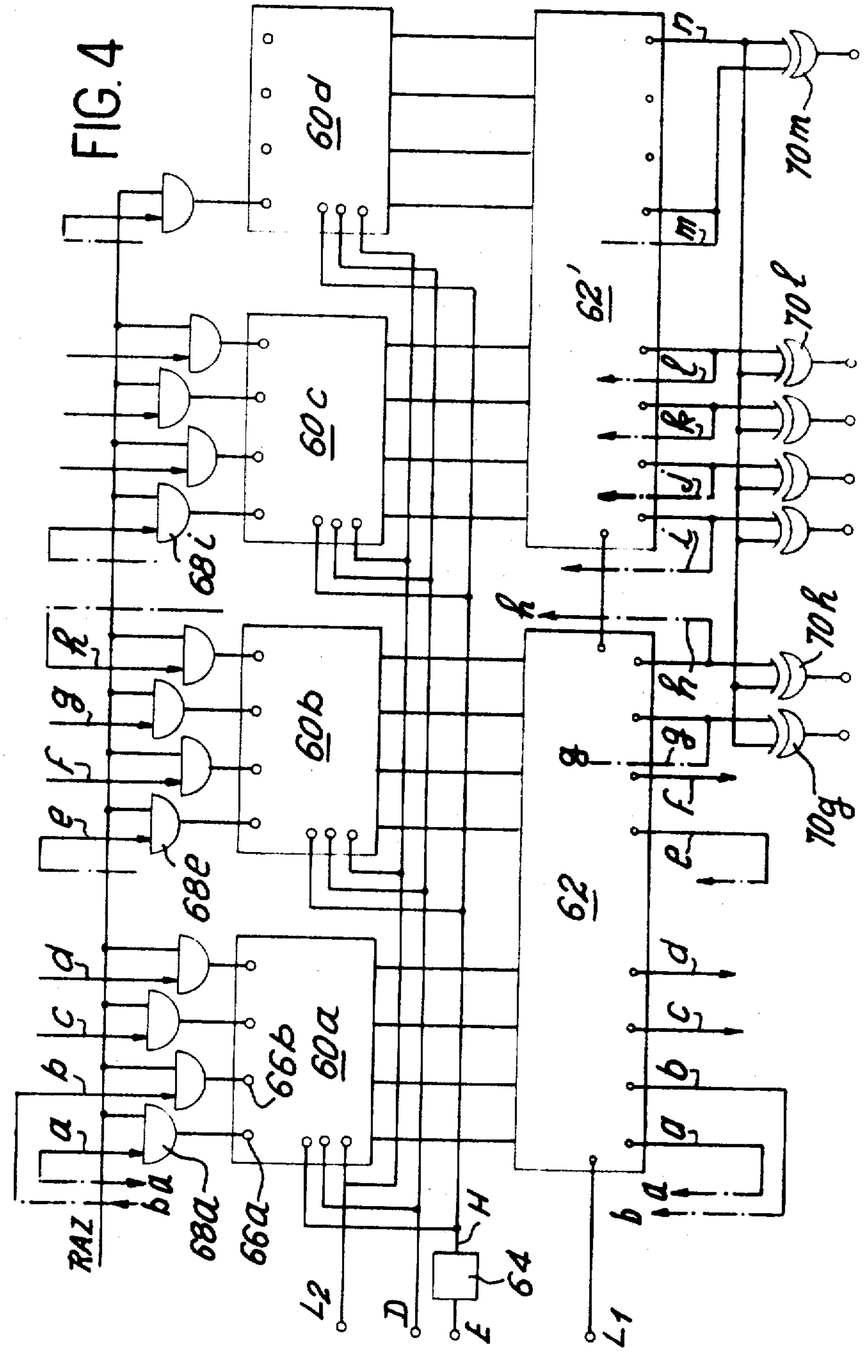
Figure 6:
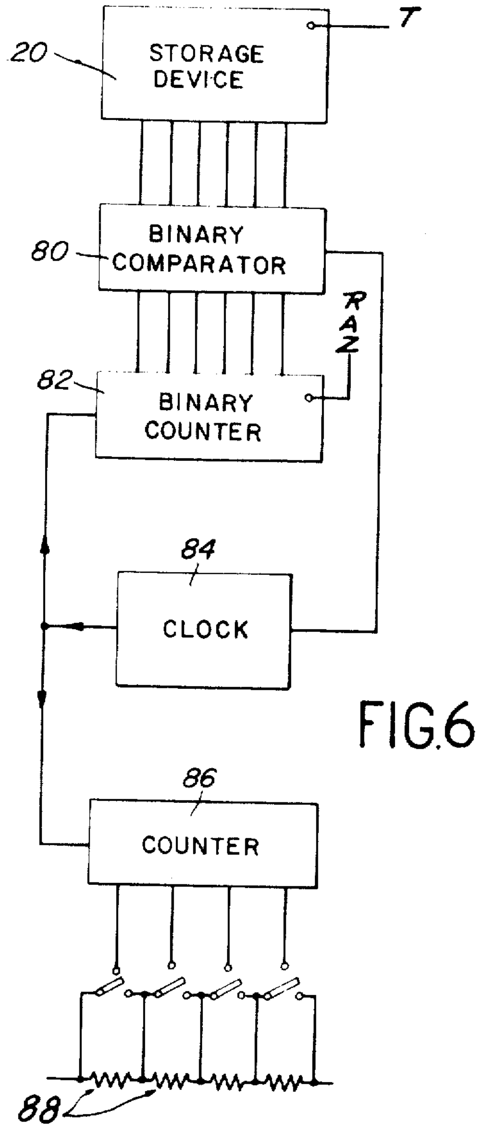

A better understanding of the invention will in any case be gained from the following description of one embodiment of the invention which is given by way of example without any implied limitation, reference being made to the accompanying figures, in which:

- FIG. 1 is a schematic diagram of the device;
- FIG. 2 is one example of construction of the gating circuit;
- FIG. 2' shows the signals which correspond to this gating operation;
- FIG. 3 shows an example of construction of the logic circuit employed for generating the counting signals;
- FIGS. 3'a and 3'b show the signals which correspond to the counting logic circuit;
- FIG. 4 shows the circuit arrangement which corresponds to the main counter and to the main storage device;
- FIG. 5 shows the circuit arrangement which corresponds to the secondary counter and output quantities;
- FIG. 6 shows one example of construction of the correction device.

Prior to processing, the binary signals recorded on the tracks are shaped as shown in FIG. 2' in the case of the signals $E_1$ and $E_2$. This shaping operation can be carried out by any means and in particular by monostable circuits having a time constant which is substantially equal to the half-period of the recording frequency.

The device as shown in the schematic diagram of FIG. 1 first comprises the shaping circuit 2 which delivers the signals $E_1$ and $E_2$, said signals being applied to the input of the gating device 4. The gating device 4 generates the signals $N_1$, $N_2$ and R which are applied to the input of the counting logic circuit 6. By means which will be described hereinafter, said counting logic circuit 6 generates the signal E which is representative of the relative displacement between the leading edges of the signals $N_1$ and $N_2$, the signal $L_1$ which is present if the two signals $N_1$ and $N_2$ are present, the signal $L_2$ which is present if at least one of the signals $N_1$ and $N_2$ is present and finally the signal D which has the binary value 0 or 1, depending on whether $N_1$ or $N_2$ appears first, that is to say according as the relative displacement is intended to be counted either positively or negatively. The pulses delivered by a generator for producing recurrent or clock signals 8 are counted by the main counter 10, the signal E being intended to control the generator 8. The signal $L_1$ which is applied to the main storage device 12 transfers the contents of the main counter 10 into said main storage device. The signal $L_2$ which is applied to the control input of the main counter 10 transfers the binary state of said storage device 12 into the main counter 10, the outputs of the main storage device being closed on the preloaded inputs of the main counter. The outputs of the storage device are connected to a divider 14. The signal $L_1$ is also applied to the input of a secondary binary counter 16 which is preset at the value M. When the secondary counter 16 has counted M pulses of the signal $L_1$, said counter emits the signal C. The term "preset" is understood to mean that the counter is at zero at the beginning of a cycle and emits a signal when the state of the counter corresponds to a preselected value.

The output of the divider 14 is fed into a complementation system 18 and then converted if necessary into a numerical quantity. The output of the complementation system 18 is fed into a secondary storage device 20 and towards a display system 22. The delayed signal C is applied to the zero-resetting input of the main counter 10 and of the secondary counter 16 as well as to the control input of the secondary storage device 20. The output of the secondary storage device 20 is connected to a system 23 for correcting relative displacement.

The diagram of FIG. 1 is not intended to show the actual electrical connections which exist between the different elements of the device but to give a clear idea of the logical connections between these different elements.

FIG. 2 shows on example of construction of the gating device 4 for the signals $E_1$ and $E_2$. This device comprises two flip-flops J, K, the clock inputs of which are driven respectively by the signals $E_1$ and $E_2$. As will always be the case in the following description, said flip-flops J, K are mounted in such a manner as to ensure that the input J has the logical level 1 whereas the input K has the logical level 0. The flip-flops 24 and 26 deliver the signals $N_1$ and $N_2$ respectively at their non-reversing outputs. The two AND-gates 28 and 30 are driven respectively by the signals $N_1$, $\bar{E}_1$, $\bar{E}_2$, and by $N_2$, $\bar{E}_1$ and $\bar{E}_2$, the signals $\bar{E}_1$ and $\bar{E}_2$ being obtained from the signals $E_1$ and $E_2$ by means of the inverters 32 and 34. The outputs of the gates 28 and 30 are applied to the input of a third AND-gate 36, the output of which is connected to the clock input of a third flip-flop J, K 38, said flip-flop 38 being intended to deliver the third gating signal R. The output signal of the gate 36 is also fed into a series of three monostable circuits 40, 40' and 40'' which are mounted in series. The output of the monostable circuit 40' is applied to the reset inputs of the flip-flops J K 24 and 26 whereas the output of the monostable circuit 40'' is applied to the reset input of the flip-flop 38.

FIG. 2' illustrates the operation of the gating system 4. The flip-flops 24 and 26 deliver the signal + 1 when they detect the trailing edges of the signal $E_1$ and $E_2$, thereby giving rise to the leading edges of the signals $N_1$ and $N_2$. At the output of the gate 36, we have the signal $B = (N_1+N_2) \cdot \bar{E}_1 \cdot \bar{E}_2$. This signal assumes the value 1 after the last trailing edge of the signals $E_1$ and $E_2$. Said signal reverts to the value 0 when the second leading edge of the signal $E_1$ or $E_2$ appears; in fact, in this case, either $\bar{E}_1$ or $\bar{E}_2$ has the value of zero. With this trailing edge, the flip-flop 38 delivers a signal having the level 1, that is to say the signal R. Said signal R therefore appears with the second leading edge of the first of the signals $E_1$ and $E_2$. Zero-resetting of the signals $N_1$ and $N_2$ is carried out by the signal B to which are applied the time-delays corresponding to the monostable circuits 40 and 40' whereas zero-resetting of the signal R is also carried out from the signal B to which are applied the time-delays coresponding to the monostable circuits 40, 40' and 40''. The trailing edge of the signal R is therefore always later in time than the common trailing edge of the signals $N_1$ and $N_2$.

It is readily apparent that the form of construction of the gating system 4 is given solely by way of example. Any other mode of gating in which three signals $N'_1$, $N'_2$, R' are delivered and in which the conditions stated below are established accordingly remains within the scope of the invention. The signal $N'_1$ exists only if the signal $E_1$ exists; similarly, the signal $N'_2$ exists only if the signal $E_2$ exists. The signals $N_1$ and $N_2$ have the same trailing edge and the time which elapses between their leading edges must be equal to the relative displacement between the signals $E_1$ and $E_2$. The signal R must have a leading edge which occurs later in time than the leading edges of the signals $N'_1$ and $N'_2$ and a trailing edge which also occurs later in time than the trailing edge of said signals $N_1$ and $N_2$.

FIG. 3 shows one form of construction of the counting logic circuit 6, that is to say one mode of production of the signals $L_1$, $L_2$, E and D. The signal $L_1$ is generated by means of an AND-gate 42, the three inputs of which are driven respectively by the signals $N_1$, $N_2$ and R and by an inverter gate 44. The counting logic circuit 6 further comprises a first AND-gate 46 which is driven by the signals $N_1$ and $N_2$ and the output of which is connected to one of the inputs of the AND-gate 48. The gate 48 whose second input is driven by the signal R delivers the signal $L_2$ at its output. The AND-gate 50 is driven by the signals $\bar{N}_1$ and $\bar{N}_2$ and the output of said gate is connected to one of the inputs of the AND-gate 52. The gate 52 is also driven by the signal $\bar{R}$ (obtained from the signal R by means of the inverter 56) and by the output of the gate 46 which delivers the signal E at its output. The clock input of the flip-flop 54 "of type D" is connected to the output of the AND-gate 55 and in turn driven by the signals $\bar{N}_1$ and $\bar{N}_2$ and said flip-flop delivers the signal D; its reset input is connected to the output of the gate 48.

The operation of the counting logic circuit 6 is illustrated by the curves of FIG. 3'. The signal $L_1$ delivered by the AND-gate 42 and the inverter 44 is present if $N_1$, $N_2$ and R are also present. The signal $L_2$ delivered by the gate 48 presents a pulse (zero level) if R is present and if $N_1$ and $N_2$ are at the zero level.

FIG. *3'a* is concerned with the case in which the signals $N_1$ and $N_2$ are both present (the diagrams in dashed lines relate to the case in which $N_1$ precedes $N_2$ and those in full lines relate to the contrary case). On the other hand, FIG. *3'b* illustrates the case in which only one of the signals $N_1$ and $N_2$ is present (namely in this case the signal $N_2$).

It is readily apparent that the description given herein is directed to a particular embodiment which is related to a certain technology and that it would be possible to modify the generation of the signals without departing from the scope of the invention if the conditions imposed on said signals are complied with. In particular, the signals $L_2$ and E are quiescent at the level 1 and produce pulses at the level 0. This configuration is clearly dependent on the technology employed and there would again be no departure from the purview of this invention if inverters were placed at the output of the circuit which generates the signals $L_2$ and E, thereby producing pulses at the level + 1 in the case of said signals.

FIG. 4 shows a diagram of construction of the main storage device and the main counter. This assembly essentially comprises four binary counters $60_a$, $60_b$, $60_c$, $60_d$ which are mounted in parallel and two storage devices 62 and 62' which are also mounted in parallel. The signal E is applied to the input of a multivibrator 64 which delivers during the period of the signal E a clock signal H having a given frequency. Said signal H is applied to the clock inputs of the counters $60_a$, $60_b$ and so forth. The signal D is applied to the "direction of counting" inputs of each binary counter $60_a$, $60_b$ which serve both for counting-up and counting-down. The signal $L_2$ is applied to each of the "initialization" inputs of the counters $60_a$, $60_b$ and so forth.

When a pulse is fed to said "initialization" input, the effect of said input is to apply to each counting position the binary state which is present at the inputs *66a*, *66b* etc. which correspond to each of the counting positions. Each output of the counters *66a*, *66b*, etc. is connected to one of the inputs of the storage devices 62 and 62'. The outputs *a, b, c, ..., m* of the storage devices 62 and 62' are closed on the inputs of the counters 60*a*, 60*b* etc. by means of the AND-gates $68_a$, $68_b$, etc., the second input of which is driven by a reset signal (RAZ) which will be defined hereinafter. In the embodiment herein described, a number of the form $2^n$ has been chosen for M (number of measurements recorded by counting). In consequence, in order to divide the total time measured by the number of measurements recorded by counting, it is only necessary to ensure that the outputs of the storage devices 62 and 62' corresponding to the *n* outputs of smallest weight are not retained. In this particular case, M has the value of 64, ($2^6$) so that *n* therefore has the value of 6 and the outputs of the storage devices *a, b, c ... f* are not taken into account. The time which is summated can be either positive or negative, with the result that the complementation system is constituted by "exclusive-OR" gates 70*g*, 70*h* ... 70*m*. One of the two inputs of each gate is connected to the correspnding output of the storage devices 62 and 62' whilst the other output is connected to the outputs *n* of the storage device 62' which exceeds the useful capacity of the storage device. The logical signal 1 is applied to said output *n* when the counters $60_a$, $60_b$ etc. have the value of 0 and when the signal D corresponds to counting-down. In the other cases, the signal applied to the output *n* has the value 0. The outputs G', H' ... M' of the "exclusive-OR" gates are connected on the other hand to a display device by means of decimal binary converters or analog binary converters.

It can readily be understood that the number of counters 60 and storage devices 62 depends on the total time to be recorded by counting. It is also apparent that the system of division employed is applicable only if the nunber of pulses of the signal $L_1$ which is recorded by counting is of the form $2^n$. If this is not the case, a divider is placed at the output of the storage devices 62 and 62' after having converted the binary signals to analog signals if necessary and after having carried out the complementation by means of the device herein described. A divider of this type is well known and can in particular be constructed from an operational amplifier.

The operation of this portion of the device is as follows:

- throughout the duration of the signal E, the multivibrator 64 emits pulses H which are counted by the counters 60, the direction of counting being imposed by the signal D. If the signal $L_1$ appears, that is to say if the signal $N_1$ and the signal $N_2$ in fact exist, the state of the counter 60 is transferred into the storage devices 62 and 62'. Inasmuch as the outputs A, B, etc. of the storage devices 62 and 62' are closed on the inputs of the counters 60, the counters $60_a$, $60_b$, etc. revert to their previous value when the signal $L_2$ appears (this signal being always later in the time than the signal $L_1$).

The secondary counter shown in FIG. 5 is constituted by two identical binary counters 70 and 70' which are mounted in parallel. The clock input of said counters is driven by the signal $L_1$. Said counters are preset at the value M ($2^6$ in the example considered) and the counter 70' emits the signal $C_2$ when the binary state of the two counters has the value M. The signal $C_2$ is inserted at the input of an AND-gate 72, the other input of which is driven by the output of a second AND-gate 74, the signals $\bar{E}_1$ and $\bar{E}_2$ being applied to the input of said second gate. The output signal of the gate 72 drives two serially mounted monostable circuits 76 and 76'. The monostable circuit 76 delivers the transfer signal T (the utilization of which will be explained hereinafter) whereas the monostable circuit 76' delivers the reset signal (RAZ) which is applied to the input of the counters $60_a$, $60_b$, etc. and of the counters 70 and 70'.

In FIG. 6, there is shown one example of arrangement of the device for correcting relative displacement. This device essentially comprises a binary comparator 80 of known type, one of the series of inputs of which is connected to the outputs of the secondary storage device 20 and the other series of inputs of which is connected to the outputs of a first binary counter 82, the reset input of which is driven by the signal RAZ. A clock 854 delivers a pulsed signal which is applied to the input of the counter 82, as well as to the input of a second counter 86. The clock 84 is controlled by the comparison signal which is generated by the comparator 80. The signal T is applied to the control input of the secondary storage device 20. The outputs of the counter 86 control delay elements 88 which are placed in the reading chain of the recording system, the applied time-delay being proportional to the state of the counter 86.

The operation is very simple. When the signal T appears, the state of the secondary storage device 20 is applied to one of the inputs of the comparator 80. The clock 84 emits pulses until the counter 82 has the same binary state as the secondary storage device 20. The counter 86 also counts the pulses delivered by the clock 84. The outputs of said counter control the delay devices 88. There is thus applied within the reading chain a time-delay equal to the mean relative displacement measured between the signals of the two tracks.

The foregoing description is concerned with the measurement and the correction of the relative displacement which exists between the reference track and a given recording track of the storage device. Measurement of the relative displacement between each track and the reference track is carried out sequentially. The complete device comprises only one measuring assembly but a number of secondary storage devices and correcting devices corresponding to the number of recording tracks. When a measuring cycle has been completed in the case of one track, the result (mean difference) is recorded in the corresponding secondary storage device and the measuring device then calculates the mean relative displacement between the reference track and another recording track.

As shown in FIG. 5, the transfer signal T is generated in such a manner as to ensure that it can appear only in the absence of the signals $E_1$ and $E_2$. In fact, when the signal T appears, the correction is applied to the relative displacement between the two signals. If this correction were to take place during measurement of the mean relative displacement, this measurement would clearly serve no purpose.

The degree of accuracy achieved in the measurement of the mean relative displacement obviously depends on the frequency of the signal H emitted by the multivibrator. As the frequency is of higher value, so the measurement is more accurate since each relative displacement between the two signals is thus measured with a higher degree of precision.

It is readily apparent that the present invention is not limited to the exemplified embodiments which have been more especially described with reference to the drawings but extends to all alternative forms.

What we claim is:

1. A method for measuring and adjusting the relative displacement between binary signals corresponding to information recorded on the different tracks of a kinematic magnetic storage device, wherein use is made of a reference track and the relative displacement between the binary signals contained in said track and those contained in each of the other tracks is measured by carrying out the following operations on each set of two tracks:

- shaping said binary signals,
- producing a signal A which represents both in magnitude and in sign the relative displacement in time between the two signals,
- producing a signal N which is generated only if the two signals which have previously been shaped coexist correspond to pulses having at least a partial and common existence in time,
- measuring and storing the time-duration of the signal A,
- totalizing said time-duration corresponding to each of only those measurements for which a signal N was generated,
- dividing the total time-duration by the number of measurements in which the signal N is present,
- storing the quotient resulting from said dividing, said quotient representing the mean relative displacement between the recordings on the two tracks under comparison,
- correcting for the mean relative displacement which is thus measured.

2. A method according to claim 1, wherein the signal recorded on one of said tracks is a clock signal.

3. A device for adjusting the relative displacement between binary signals corresponding to the information recorded on the different tracks of a kinematic magnetic storage device comprising:

- means for shaping the binary signals corresponding to two recording tracks which deliver the corresponding shaped signals $E_1$ and $E_2$,
- means for gating said signals and delivering the signals $N_1$, $N_2$ and R, $N_1$ which exist if $E_1$ exists, the signal $N_2$ which exists if $E_2$ exists, the leading edges of each pulse of the signals $N_1$ and $N_2$ being intended to have the same relative displacement as the trailing edges of the corresponding pulses of the signals $E_1$ and $E_2$ and also to have common trailing edges, the leading edge of each pulse of the signal R being later in time than the leading edges of the signals $N_1$ and $N_2$ whilst its trailing edge is later in time than that of $N_1$ and $N_2$,
- a counting logic circuit comprising means for generating a signal $L_1$ which exists if $N_1$ and $N_2$ are present simultaneously, a signal $L_2$ which exists if one of the signals $N_1$ and $N_2$ is present and which is later in time than $L_1$, a signal E having a width which is proportional to the distance between the leading edges of $N_1$ and $N_2$ and a signal D which represents the order of appearance of the signals $N_1$ and $N_2$ and the leading edge of which coincides with that of the signal E,
- a main binary counter which counts the pulses delivered by a recurrent-signal generator during the period of the signal E and in which the direction of counting is imposed by the signal D,
- a main storage device which is connected to the outputs of the main binary counter and the access of which is controlled by the signal $L_1$, the signal $L_2$ being intended to reload the main counter to the value possessed by the storage device at the time of the previous measurement, each output of the storage device being fed back to the corresponding input of the main counter,
- a secondary counter whose input is driven by the signal $L_1$ and preset at a value M, said counter being intended to emit the output signal C when it has counted M pulses of the signal $L_1$,
- a divider for dividing by the number M, the input of which is connected to the output of the main storage device and the output of which drives the input of a secondary storage device whose control input is in turn driven by the delayed signal C,
- a correction system controlled by said secondary storage device applying in the recorded-information reading circuit a time-delay which is equal to the delay recorded by the secondary storage device.

4. A device according to claim 3, wherein the gating system is constituted by two flip-flops J, K whose clock inputs receive the signals $E_1$ and $E_2$ respectively and which delver the signals $N_1$ and $N_2$, two AND-gates such that the first gate is driven by the signals $N_1$, $\bar{E}_1$ and $\bar{E}_2$ and the second gate is driven by the signals $N_2$, $\bar{E}_1$ and $\bar{E}_2$, the outputs of said gates being connected to the inputs of a third AND-gate whose output is connected to the clock input of a third flip-flop J K whose output delivers the signal R, the output of the third AND-gate being also connected to an assembly of three monostable circuits which are mounted in series, the output of the second monostable circuit being connected to the reset inputs of the two first flip-flops J K, the output of the third monostable circuit being connected to the reset input of the third flip-flop J K.

5. A device according to claim 3, wherein the main up/down counter is constituted by a plurality of binary counters whose inputs are mounted in parallel, the clock inputs being connected to a multivibrator controlled by the signal E, the control inputs being driven by the signal $L_2$, the "direction of counting" inputs being driven by the signal D, the outputs being connected to the inputs of a plurality of binary storage devices having a number of storage positions corresponding to the counting positions of the counters, the control inputs of said storage devices being driven by the signal $L_1$ and each storage output being connected to the corresponding input of the counters.

6. A device according to claim 3, wherein the correction system is composed of a comparator having one input which is connected to the output of the secondary storage device whilst the other input is connected to a first binary counter which is connected to the output of a clock controlled by the comparison signal emitted by the comparator, said clock being also connected to a second binary counter whose state controls the opening and closure of delay elements placed in the reading chain.

* * * * *